United States Patent [19]

Park

[11] Patent Number: 5,790,214
[45] Date of Patent: Aug. 4, 1998

[54] LIQUID CRYSTAL DISPLAY WITH PORTION OF COMMON ELECTRODE ON ONE SIDE OF EACH SUBSTRATE AND LIGHT SOURCE ON OPPOSITE SIDE

[75] Inventor: Hyeon-chang Park, Pusan, Rep. of Korea

[73] Assignee: Samsung Display Devices Co., Ltd., Kyungki-do, Rep. of Korea

[21] Appl. No.: 654,605

[22] Filed: May 29, 1996

[30] Foreign Application Priority Data

Sep. 26, 1995 [KR] Rep. of Korea ............... 95-31917

[51] Int. Cl.$^6$ ............... G02F 1/1335; G02F 1/133; G02F 1/1343
[52] U.S. Cl. ............... 349/69; 349/61; 349/70; 349/73; 349/142
[58] Field of Search ............... 349/61, 68, 70, 349/73, 143, 142, 69; 186/61; 395/216; 235/383

[56] References Cited

U.S. PATENT DOCUMENTS

| | | |
|---|---|---|
| 4,281,901 | 8/1981 | Ushiyama ............... 349/143 |
| 4,335,936 | 6/1982 | Nonomura et al. ............... 349/143 |
| 4,375,317 | 3/1983 | Funada et al. ............... 349/143 |
| 4,487,480 | 12/1984 | Nonomura et al. ............... 349/143 |
| 4,659,182 | 4/1987 | Aizawa ............... 349/143 |
| 4,834,503 | 5/1989 | Tsujimoto et al. ............... 349/73 |
| 5,272,553 | 12/1993 | Yamamoto et al. ............... 349/143 |

*Primary Examiner*—Anita Pellman Gross
*Attorney, Agent, or Firm*—Leydig, Voit & Mayer, Ltd.

[57] ABSTRACT

A liquid crystal display has an upper substrate, a lower substrate, and a liquid crystal layer, disposed between the upper and lower substrates. First segment electrodes are formed in one portion of the upper substrate, and a first common electrode is formed in the other portion thereof. A second common electrode is formed on the portion of the lower substrate corresponding to that of the first segment electrodes, and second segment electrodes are formed on the portion of the lower substrate corresponding to that of the first common electrode. The dual-faced liquid crystal display enables observation of identical data on the front and rear surfaces thereof, with a single liquid crystal cell.

5 Claims, 3 Drawing Sheets

LIQUID CRYSTAL DISPLAY WITH PORTION OF COMMON ELECTRODE ON ONE SIDE OF EACH SUBSTRATE AND LIGHT SOURCE ON OPPOSITE SIDE

BACKGROUND OF THE INVENTION

The present invention relates to a liquid crystal display (LCD), and more particularly, to a dual-faced LCD for displaying identical data on front and rear surfaces thereof.

An LCD, which is a type of flat display device, is generally formed by injecting liquid crystal between substrates on which electrodes are formed. Visual data may be displayed on the LCD by changing the arrangement of the liquid crystal according to the application of current to the electrodes. An example of the application of the LCD is a cash register used in a store. Such a cash register uses the LCD to display the prices of purchased products and the total sum thereof. Here, as the prices are input to the cash register, each price is displayed on an LCD so that a clerk may confirm the input. A conventional cash register, however, has only one LCD installed at a position favorable to the clerk, thus precluding viewing by a customer.

In an effort to circumvent this problem and allow both the clerk and the customer to view the display at the same time, two LCDs whose rear surfaces are in contact with each other have been suggested. However, since this display device uses two individual displays, two sets of electrical equipment for driving he LCDs are needed. Accordingly the display device becomes large, and its fabrication cost is increased.

SUMMARY OF THE INVENTION

To overcome the above problems, it is an object of the present invention to provide a dual-faced LCD for displaying identical data on the front and rear surfaces thereof.

It is another object of the present invention to provide a dual-faced LCD having backlights formed on portions of the front and rear surfaces thereof.

To achieve the above objects, there is provided a liquid crystal display comprising an upper substrate having upper and lower surfaces, a lower substrate having upper and lower surfaces disposed such that the upper surface of the lower substrate faces the lower surface of the upper substrate, and a liquid crystal layer disposed between the upper and lower substrates, and common and segment electrodes formed on the facing surfaces of the lower surface of the upper substrate and the upper surface of the lower substrate, wherein first segment electrodes are formed on a first portion of the lower surface of the upper substrate, and a first common electrode is formed on a second portion of the lower surface of the upper substrate, and wherein a second common electrode is formed on a first portion of the upper surface of the lower substrate corresponding to the first portion of the upper substrate having the first segment electrodes, and second segment electrodes are formed on a second portion of the upper surface of the lower substrate corresponding to the second portion of the upper substrate having the first common electrode.

Preferably, a backlight means is installed on the rear portion of the surface having the common electrodes in the upper and lower substrates, respectively.

Preferably, the backlight means is one of a cold cathode fluorescent tube, a light emitting diode and an electronic luminescent diode.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
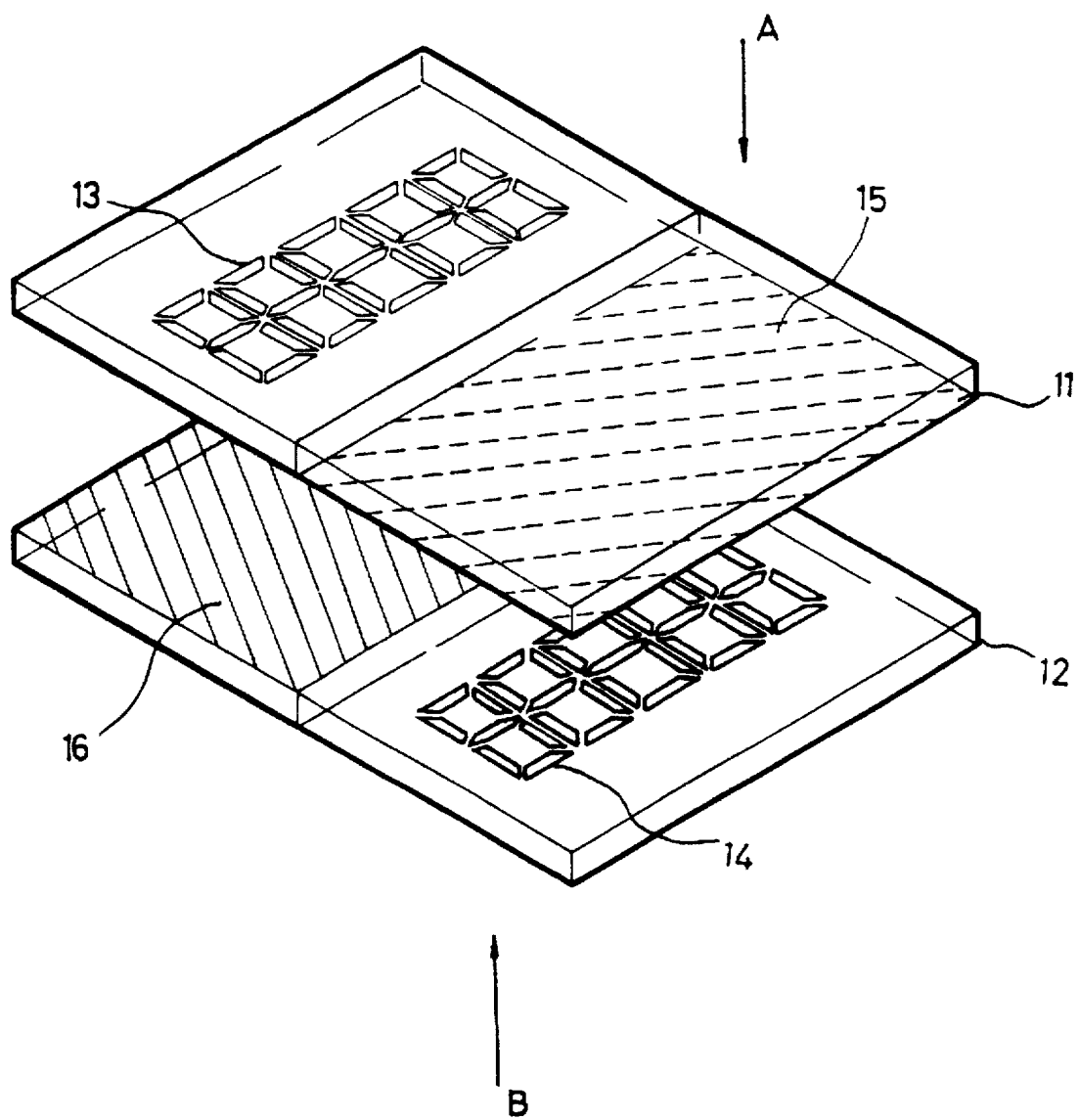
FIG. 1 is an exploded perspective view of main portions of a liquid crystal display according to an embodiment of the present invention.

FIG. 1 is a schematic exploded view of a dual-faced LCD according to the present invention. The dual-faced LCD comprises an upper substrate 11, a lower substrate 13, and a liquid crystal layer (not shown).

As shown in FIG. 1, electrodes are formed on the lower surface of the upper substrate 11 and the upper surface of the lower substrate 12. Each of the upper substrate 11 and the lower substrate 12 is divided into two halves and has a common electrode on one half and segment electrodes on the other half. Here, though the substrates are shown as divided into halves, division into any number of parts is possible, as desired.

First segment electrodes 13 for displaying figures are formed on one half on the lower surface of the upper substrate 11, and a first common electrode 15 is formed over the other half. In the lower substrate 12, second segment electrodes 14 are formed on the same half of the upper surface thereof as the first common electrode 15, and a second common electrode 16 is formed over the same half as the first segment electrodes 13. The LCD shown in FIG. 1 enables the simultaneous observation of data displayed on the front and rear surfaces thereof. That is, assuming that a clerk views data from a direction "A," a customer can simultaneously view the same data from a direction "B."

Figure 2:
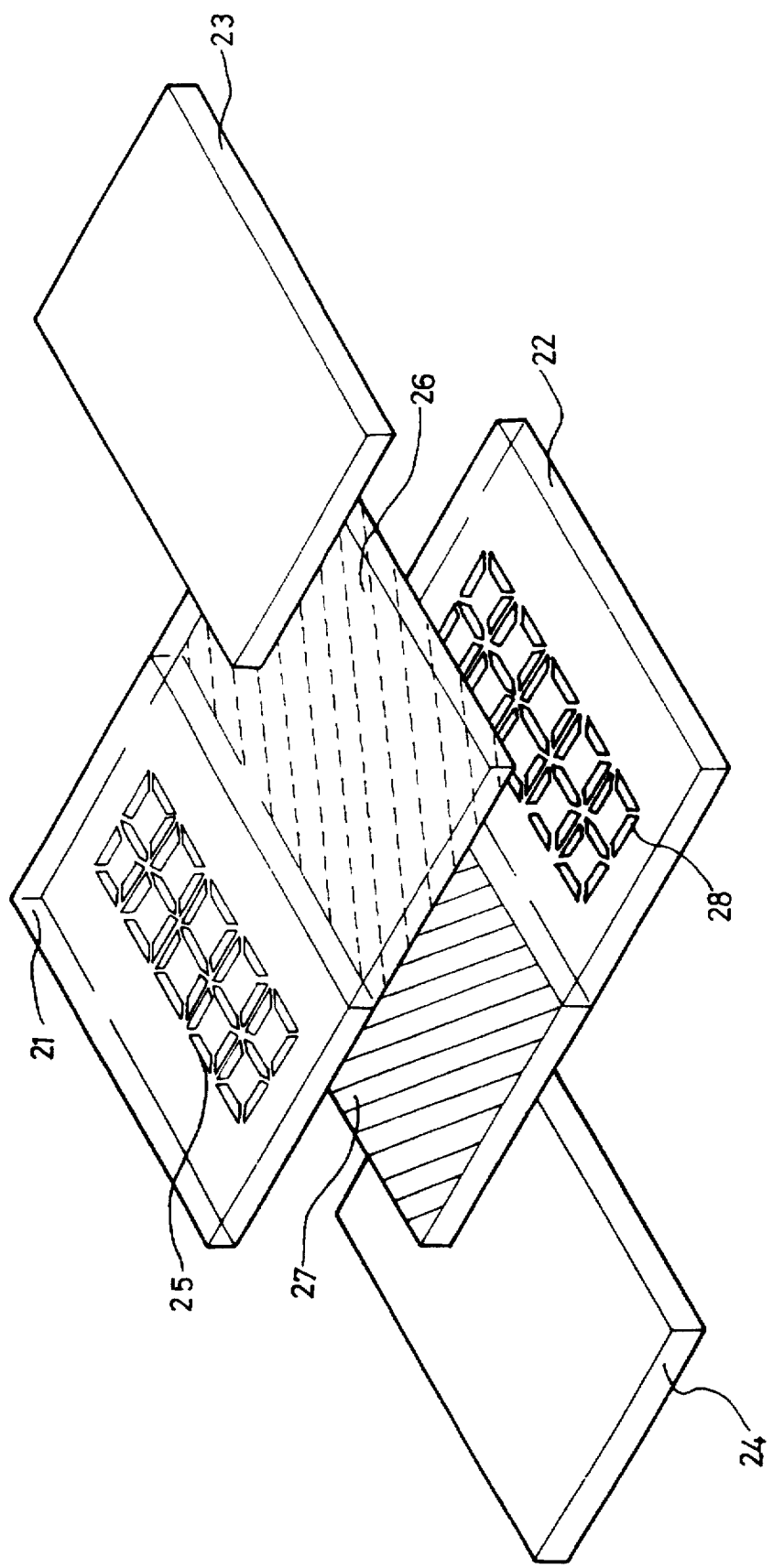
FIG. 2 is an exploded perspective view of main portions of a liquid crystal display according to another embodiment of the present invention.

FIG. 2 illustrates another embodiment of a dual-faced LCD according to the present invention. In this embodiment, first segment electrodes 25 and first common electrode 26 formed on an upper substrate 21 and a second common electrode 27 and second segment electrodes 28 formed on a lower substrate 22 are identical to those of FIG. 1. The dual-faced LCD shown in FIG. 2 is provided with backlights 23 and 24 half as large as the upper and lower substrates 21 and 22, to increase the contrast of the liquid crystal display. The backlight 23 is installed on rear portion of the half surface having a first common electrode 26 formed thereon, in the upper substrate 21, and the backlight 24 is installed on the half having the second common electrode 27 formed thereon, in the lower substrate 22. A cold cathode fluorescent tube, a light-emitting diode or an electroluminescent diode can be used as the backlights 23 and 24.

Figure 3:
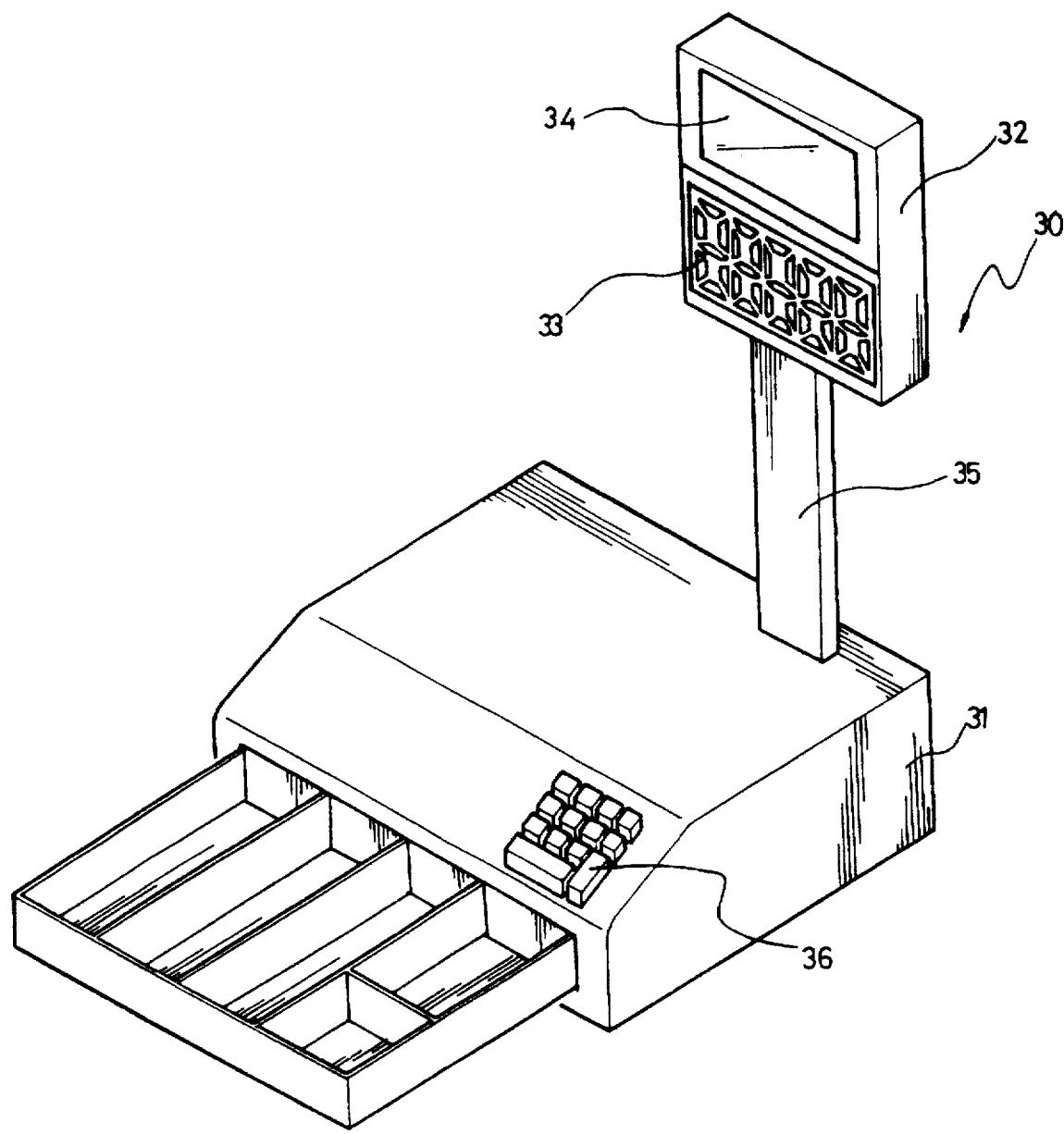
FIG. 3 is an exploded perspective view of a cash register to which a liquid crystal display according to the present invention is applied.

FIG. 3 illustrates a dual-faced LCD of the present invention utilized in conjunction with a cash register. A cash register 30 is provided with a dual-faced LCD portion 32 supported by a support 35 on a main body 31. The LCD portion 32 is divided into an upper part 34 and a lower part 33. From the point of view of a clerk, figures input from a keyboard 36 are displayed on the lower part 33. A customer can see the same data on the rear surface of the upper part 34.

The dual-faced LCD according to the present invention enables observation of identical data on the front and rear

What is claimed is:

1. A liquid crystal display comprising:

an upper substrate having upper and lower surfaces;

a lower substrate having upper and lower surfaces, the lower substrate being disposed such that the upper surface of the lower substrate faces the lower surface of the upper substrate;

a liquid crystal layer disposed between said upper and lower substrates; and common and segment electrodes formed on the lower surface of the upper substrate and the upper surface of the lower substrate, wherein first segment electrodes are formed on a first portion of the lower surface of said upper substrate, and a first common electrode is formed on a second portion of the lower surface of said upper substrate, and wherein a second common electrode is formed on a first portion of the upper surface of said lower substrate corresponding to said first portion of said upper substrate having said first segment electrodes, and second segment electrodes are formed on a second portion of the upper surface of said lower substrate corresponding to the second portion of said upper substrate having said first common electrode.

2. The liquid crystal display as claimed in claim 1, further comprising backlight means, wherein said backlight means is installed at a portion of the lower surface of said lower substrate opposite said second common electrode and installed at a portion of the upper surface of said upper substrate opposite said first common electrode.

3. The liquid crystal display as claimed in claim 2, wherein said backlight means comprises a cold cathode fluorescent tube.

4. The liquid crystal display as claimed in claim 2, wherein said backlight means comprises a light emitting diode.

5. The liquid crystal display as claimed in claim 2, wherein said backlight means comprises an electroluminescent diode.

* * * * *